Feb. 2, 1960     C. W. MacMILLAN     2,923,147
SHOCK ABSORBER TESTER
Filed June 27, 1958     2 Sheets-Sheet 1
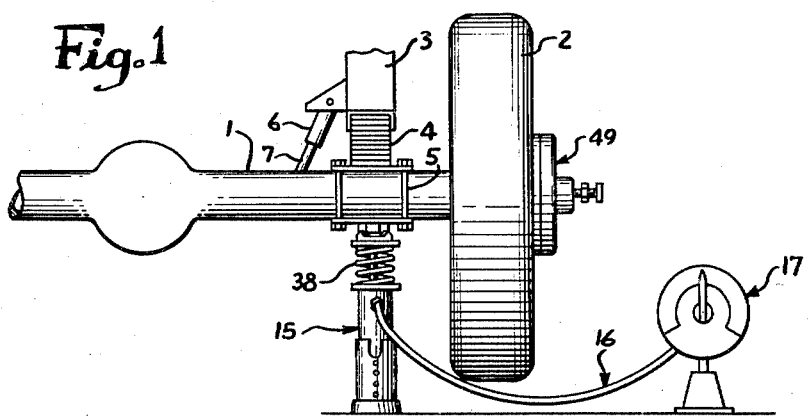
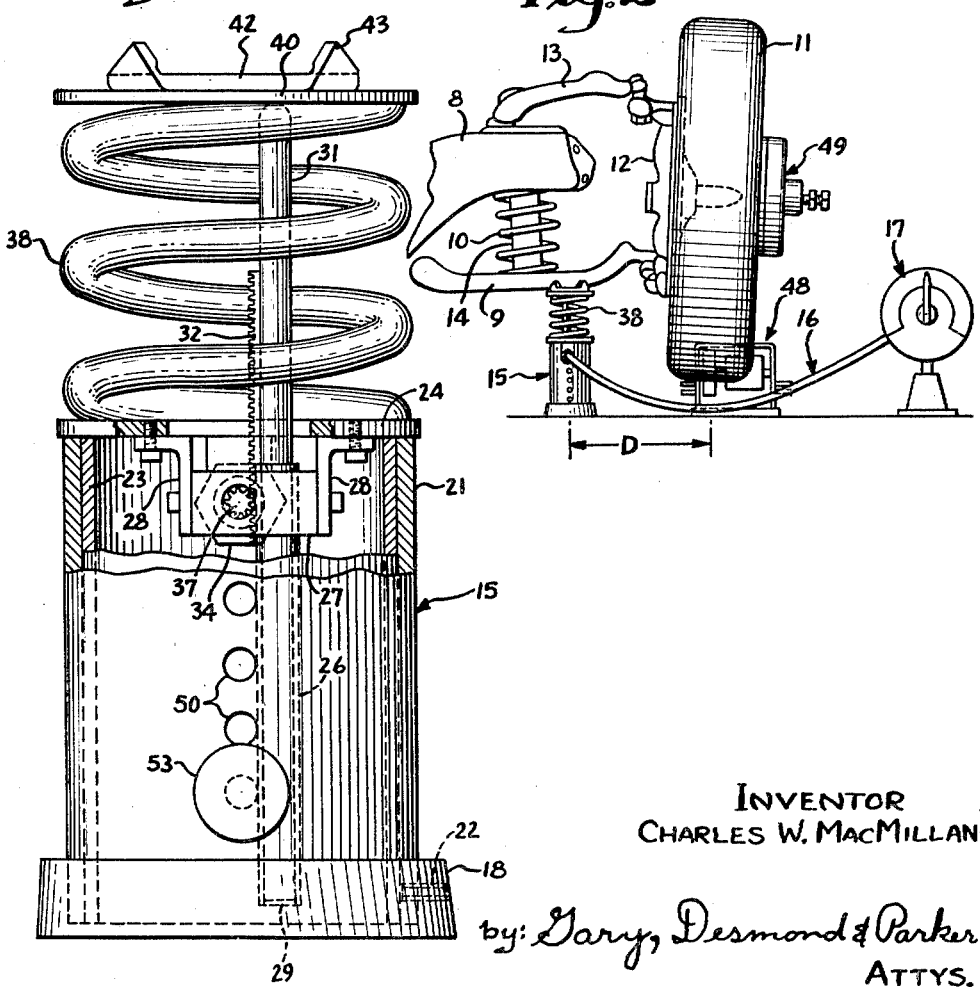
INVENTOR
CHARLES W. MacMILLAN
by: Gary, Desmond & Parker
ATTYS.

Feb. 2, 1960     C. W. MacMILLAN     2,923,147
SHOCK ABSORBER TESTER
Filed June 27, 1958     2 Sheets-Sheet 2
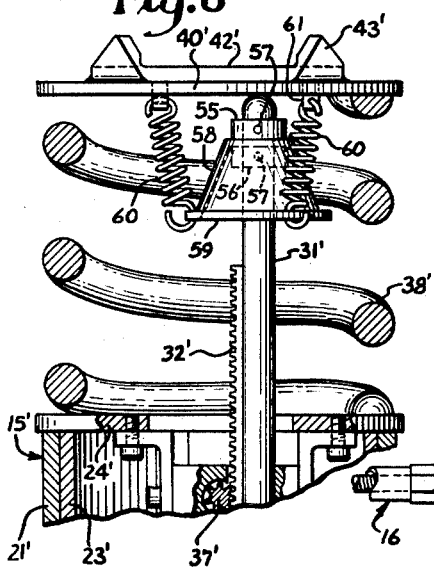
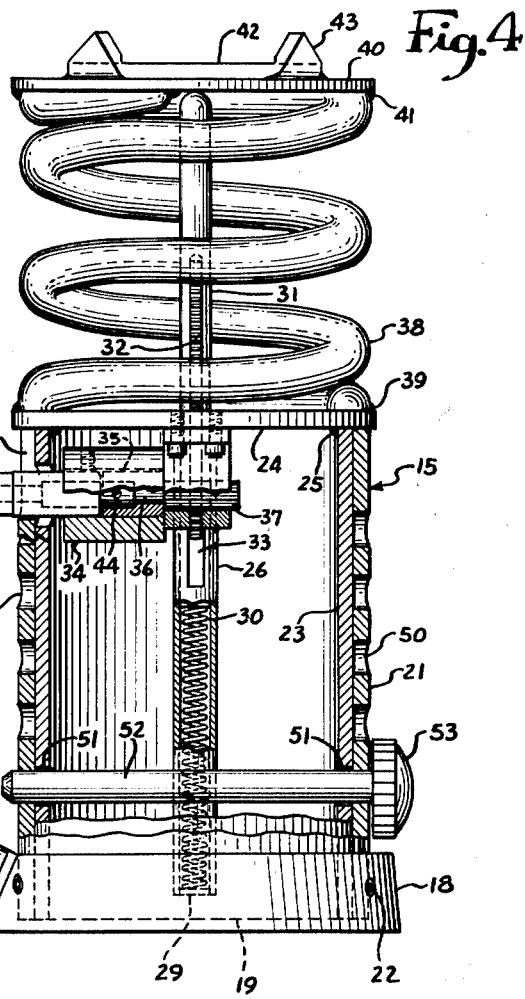
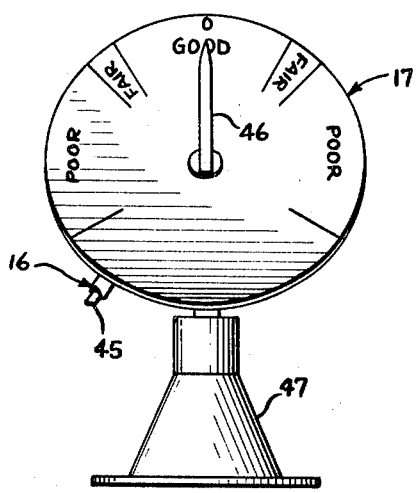
INVENTOR
CHARLES W. MacMILLAN
by: Gary, Desmond & Parker
ATTYS.

United States Patent Office 2,923,147
Patented Feb. 2, 1960

2,923,147

SHOCK ABSORBER TESTER

Charles W. MacMillan, Rock Island, Ill., assignor to Bear Manufacturing Company, Rock Island, Ill., a corporation of Delaware Application June 27, 1958, Serial No. 745,151

5 Claims. (Cl. 73—11)

This invention relates to improvements in shock absorber testers for testing the condition of automotive vehicle shock absorbers, and refers particularly to a shock absorber tester which may test shock absorbers without removing them from the vehicle or dismantling the shock absorbers on the vehicle to apply the tester thereto.

The present invention comprises a shock absorber tester which is effective in ascertaining the condition of a shock absorber wherein the shock absorber is actuated by the periodic impulses imparted thereto by the rotation of an unbalanced wheel.

One of the important features of the present invention resides in a shock absorber tester which converts a throw or vibration of relatively small magnitude to an accurate and readable signal or measure.

Another important feature of the invention resides in the ruggedness and simplicity of the device.

Other objects and advantages of the present invention will be apparent from the accompanying drawings and following detailed description.

In the drawings,

Fig. 1 is a partially diagrammatic view of the tester, embodying the features of the present invention, as applied to a rear wheel of an automotive vehicle.

Fig. 2 is a partially diagrammatic view of the tester as applied to a front wheel of a vehicle.

Fig. 3 is a front elevational view, parts being shown in section, of the sensing apparatus of the tester.

Fig. 4 is a side elevational view, parts being shown in section, of the device shown in Fig. 3.

Fig. 5 is a front elevational view of the indicating device employed with the tester.

Fig. 6 is a detailed sectional view of a slight modification of the tester.

Referring in detail to the drawings, 1 indicates the rear axle housing of an automobile, a rear wheel 2 being carried by the "live" axle (not shown). The body portion 3 of the automobile is carried by the usual rear spring 4 which is secured by shackle bolts 5 to the axle housing. A shock absorber 6 is secured to the body portion 3 and plunger 7 operable in the shock absorber is secured to the axle housing, as is conventional. Thus, the shock absorber is interposed between the sprung portion of the automobile, primarily the frame thereof, and the unsprung portion of the automobile, primarily the wheels and axle housing.

In Fig. 2 a front end portion of an automobile is shown and comprises a front frame portion 8. A pivoted control arm 9 is secured to the frame portion 8 and between the frame portion and the control arm, a coil spring 10 is positioned. A front wheel 11 is carried by bearing assembly 12 which is secured to the control arm 9 and an upper pivoted arm 13. A shock absorber 14 is positioned between the frame member 8 and the control arm 9. Thus, the shock absorber is interposed between the frame, the sprung portion of the automobile and the control arm, the free end of which comprises a portion of the unsprung portion of the automobile.

The device comprising the present invention may be used to test the front or rear shock absorbers 6 and 14, the device comprising a sensing apparatus shown generally at 15 in Figs. 1 and 2, the sensing apparatus being connected by a sheathed flexible cable 16 to an indicating device 17. When used to test the rear shock absorber 6, the sensing apparatus 15 is preferably disposed beneath the rear spring 4, and when testing the front shock absorber 14 the device 15 is preferably disposed beneath the control arm 9 a distance D from the wheel. The distance "D," particularly when testing the front shock absorbers, is important and comprises one of the calibration constants of the device and must closely conform to the remaining calibration constants of the device. In general, by spacing the device 15 closer to the wheel, the readings increase, while the readings decrease as the device 15 is moved further from the wheel. The distance D, when the rear shock absorbers are being tested, is not so critical, and in most instances, an approximation of this distance is satisfactory.

The sensing apparatus, shown enlarged in Figs. 3 and 4, comprises a foundation plate 18 having a depressed central portion 19 and a handle 20 whereby the device may be conveniently carried from place to place. An outer tubular member 21 is disposed with one end positioned in the depressed portion of the foundation plate and is secured thereto by screws 22. The upper end of the tubular member is open.

An inner tubular member 23 is telescopically positioned within the outer tubular member 21 and is axially movable relative thereto. A plate 24 is secured to the upper end of the inner tubular member 23 by welding 25, or the like. A tube 26 is secured at its upper end to a block 27 which, in turn, is fastened by opposite angle members 28, said angles being secured in spaced relationship to the bottom face of plate 24. The tube 26 carries a plug 29 at its lower end and a coil spring 30 is positioned in said tube with one end thereof resting on said plug.

A rod 31 is slidably positioned in the upper portion of the tube 26 and its lower end rests upon the upper end of spring 30. A rack 32 is carried by rod 31, said rack laterally projecting through slot 33 provided in the upper portion of the wall of tube 26.

A hexagonal bearing block 34 is carried by block 27 and is provided with a bore 35. A shaft 36 is journaled in said bore and carries at its end a pinion 37 which meshes with rack 32. Hence, when rod 31 moves axially, the shaft 36 is rotated.

A relatively heavy coil spring 38 is positioned upon plate 24, an endmost coil of said spring being secured to said plate as by welding 39. The upper end of spring 38 carries an abutment plate 40 which is secured to the uppermost coil as by welding 41. A contact plate 42 is welded to plate 40, the plate 42 carrying upwardly extending lugs 43 which are spaced approximately 90° from each other.

The arrangement is such that when a shock absorber is to be tested, a front or rear wheel is jacked up by a conventional jack (not shown) and the sensing apparatus 15 is disposed beneath the axle housing 1 or the control arm 9, as the case may be. The jack is then lowered until the housing or control arm rests on the contact plate 42. The corner of the automobile thus rests on the devices 15 with the wheel 2 or 11 raised from the ground. By the provision of the lugs 43, slipping of the housing or control arm on the device is effectively prevented.

Shaft 36 is joined by a coupling 44 to the end of a flexible shaft 45 which is carried through sheath 16 hereinbefore described. The coupling 44 rigidly joins the shaft 36 to the flexible shaft 45 without any play or backlash and if desired the shafts may be brazed or welded together so as to insure that no play or backlash exists.

The flexible shaft 45, at its opposite end connects, directly or through appropriate gearing (not shown) to indicator needle 46 which is adapted to operate over the face of the indicator 17. The indicator 17 may be mounted upon a suitable support 47 and the indicator face may be calibrated to indicate the condition of the shock absorber under test, as "good," "fair," "poor," or the like, depending upon the magnitude of swing of the indicator needle.

When the device 15 is disposed in operative position, as shown in Figs. 1 or 2, the weight of a corner of the automobile is supported through the medium of the spring 38. Thus, spring 38 is compressed a predetermined degree. By virtue of spring 30 in tube 26, the upper end of the rod 31 is maintained in contact with the lower face of plate 40 and whether spring 38 is compressed or relaxed, rod 31 will follow the movement of plate 40. Hence, when spring 38 is compressed by the weight of the automobile, plate 40 will descend from its normal position and rack 32 will rotate pinion 37, which, in turn, rotates cable 45 and swings pointer or needle 46.

For different weight automobiles, the needle will be swung to different positions by the static weight of the vehicle. In view of the fact that the test is conducted with respect to oscillations above and below the static position, as will be hereinafter more fully described, the dial or face of the indicator may be relatively rotatable with respect to needle 46 and when the static position of needle 46 is ascertained the index "0" on the dial is aligned with the point of the needle. Thus, the indicator is preset to a "zero" position with respect to which the oscillatory swing of the needle is referred.

After the vehicle has been positioned on the device 15 and the indicator is preset to zero position, as hereinbefore described, the wheel 2 or 11 is rotated. If the shock absorber 6 is under test, the wheel 2 may be driven by the vehicle engine through the conventional transmission or if the shock absorber 14 is to be tested, the wheel 11 may be rotated by a conventional wheel spinner 48. In either case, however, the wheel being rotated must be unbalanced whereby rotation thereof will exert a periodic downward thrust upon the device 15.

Thus, when the unbalanced wheel is rotated, the housing 1 or control arm 9 will vibrate and thus spring 38 will be alternately compressed and distended about its normal position. Rod 31 which follows the movement of plate 40 will thereby be reciprocated and needle 46 will oscillate about the zero position. The degree of swing of the needle 46 about its zero position is a function of the damping ability or condition of the shock absorber being tested and accordingly such condition can be ascertained from the indicator 17. The calibrations "good," "fair," and "poor" are arbitrary and have reference to what may be considered a properly acting shock absorber.

In view of the fact that the flexible assembly comprising the automobile springs 4 or 10, the shock absorber 6 or 14, and the spring 38, has a natural frequency and, hence, if the wheel is rotated above a speed which will be in resonance with said frequency, a maximum degree of swing of the needle 46 will be obtained during coincidence of the natural frequency and the wheel speed. Hence, in operation, the wheel 2 or 11 is rotated at a speed higher than that which will produce resonance, the wheel being permitted to slow down from its maximum speed so that the critical frequency period is passed through. Hence, in appraising the swing of the needle 46 relative to the calibrations, the reading of maximum swing of the needle is considered the true indication of shock absorber condition.

The reading given on the indicator 17 is a function, at resonant frequency, of the degree of unbalance of the wheel, the resiliency of the automobile spring, the resiliency of the spring 38 and the damping effect of the shock absorber. In properly designed springing systems, the resilient-damping relationship of the automobile spring and the shock absorber is substantially a constant for a large range of different make automobiles. Hence, by using a substantially constant unbalanced weight, which will be selected so as to normally embrace the calibrations of the indicator, and a constant resiliency of tester spring 38, the tester 15 determines the resiliency-damping relationship of the automobile spring to its companion shock absorber.

In view of the fact that the degree of unbalance of the wheels 2 or 11 is an important factor which is to be maintained substantially constant for the testing of a wide range of automobiles, the wheels 2 or 11 must be tested for balance before the shock absorber test is made. If the wheel is inherently unbalanced, it must be balanced by the addition and proper placement of conventional balance weights. Starting with a balanced wheel, the wheel may then be unbalanced to a proper measured degree.

To conveniently perform these operations, a conventional wheel balancer 49 is employed. The wheel balancer 49 is of the conventional type wheel balancer which functions to balance an automobile wheel without removing the wheel from the automobile. Employing the balancer 49 the wheel 2 or 11 may be rotated and if vibration of the wheel or automobile is noted, visually or by means of a vibration detector, the balancer 49 is maniuplated to determine the degree and location of unbalance. Weights are then added, of proper magnitude and in proper position, to balance the wheel.

With the wheel balanced, the balancer 49 may then be manipulated to displace its component weights to unbalance the wheel in a measurable degree which is indicated on the balancer. The wheel is thus conditioned for the subsequent performance of testing the shock absorber, as has been hereinbefore described.

To accommodate the sensing apparatus 15 to different housing or control arm heights, the tubular member 23 is axially movable with respect to the outer tubular member 21. The outer tubular member is provided with diametrically aligned pairs of holes 50 and the inner tubular member is provided with a pair of diametrically aligned holes 51. The inner member 23 may be moved to a desired elevation relative to the outer member 21 and a pin 52 may be positioned through a pair of opposite holes 50 and the opposite holes 51 which are brought into coincidence with the selected outer holes. Thus, the inner member 23 may be held in a desired raised position relative to the outer member. To facilitate the manipulation of pin 52, a knob 53 may be carried at one end thereof.

A slot 54 is provided in the upper edge of the outer member to receive the sheath 16 and connecting nipple through which cable 45 passes when the inner member is in its lowermost position.

Of course, although the wheel balancer 49 of the specific type described herein, is most convenient in conditioning the wheel for the subsequent shock absorber test, the wheel may be conditioned by other means, so long as the degree of unbalance of the wheel is a substantially known constant.

The device may be constructed with a pinion 37 of desired size so as to secure a desired multiplication of movement of the needle or pointer 46, the only precaution necessary being that there be as little play or backlash in the moving system as possible.

Referring particularly to Fig. 6, a slight modification of the sensing device is shown. The device shown in Fig. 6 does not use spring 30 for holding rod 31 in contact with the bottom of plate 40. Inasmuch as the device shown in Fig. 6 is substantially identical with the device shown in Figs. 3 and 4 with the exceptions noted, corresponding primed reference numerals will be applied to corresponding parts without further detailed description.

The rod 31' is slidably positioned in a tube similar to rod 31, but no spring corresponding to spring 30, is employed. Instead, a pair of collars 55 and 56 are rigidly secured to the upper portion of rod 31' by pins 57. An inverted cup-shaped member 58 is clamped between the collars 55 and 56 and the wall of the member flares outwardly and downwardly. A ring 59 is carried by the lower edge of the wall of the cup-shaped member, said ring circumscribing the rod 31'. Three coil springs 60 are anchored at one end each upon lugs 61 carried upon the bottom of plate 40', the opposite ends of said springs being anchored upon ring 59. Three or more springs 60 may be employed, if desired, and they will be positioned angular equal distances from each other. If three springs are employed, which is preferable, the springs will be spaced 120° from each other.

The springs 60 are normally under tension and function to hold resiliently the upper end of rod 31' in following contact with plate 40'. Thus, when plate 40' oscillates upwardly and downwardly rod 31' will move axially in timed relationship therewith and the indicator will be actuated in the same manner, as hereinbefore described.

It is to be understood that a shock absorber tester conforming with the concepts of the present invention can be constructed with constants and calibrations which conform with a large range of automobiles taken in conjunction with arbitrary designations as to optimum performance of shock absorbers. Of course, in the case of heavier automobiles or a change in the suspension characteristics of automobiles in which the resilient-damping relationships do not fall within present normal constant values required for accurate testing, a rating table conforming to automobiles of various characteristics or a multiple scale on the indicator may be employed to accommodate these variations, or different unbalance weights of specified amount may be used with a single scale as an alternative. In other words, the constants of the device may be changed, as desired, without departing from the basic concept of the invention.

I claim as my invention:

1. A shock absorber tester for testing the effectiveness of an automobile shock absorber interposed between the frame of the automobile and the unsprung portion thereof including a wheel in response to the oscillating impulse imparted to the unsprung portion of the automobile by the rotation of an unbalanced wheel comprising a portion of said unsprung portion, said shock absorber tester comprising a support, a coil spring carried by said support, a plate carried by said coil spring upon which the unsprung wheel assembly of the automobile is adapted to rest and which responds to the oscillations imparted by the unsprung wheel assembly, a rod slidably carried by said support, means for holding an end of said rod in following contact with said plate whereby said rod reciprocates in timed relationship with the movement of said plate, a flexible rotatable cable, rack and pinion means connecting said rod to said cable to rotate said pinion in response to reciprocating movement of said rod, and an indicator connected to the end of said cable for measuring the rotation of said cable in response to the reciprocation of said rod.

2. A shock absorber tester for testing the effectiveness of an automobile shock absorber interposed between the frame of the automobile and the unsprung portion thereof including a wheel in response to the oscillating impulse imparted to the unsprung portion of the automobile by the rotation of an unbalanced wheel comprising a portion of said unsprung portion, said shock absorber tester comprising a support, a coil spring carried at its lower end by said support, plate means carried by the upper end of said coil spring upon which the unsprung wheel assembly of the automobile is adapted to rest and which responds to the oscillations imparted to the unsprung wheel assembly, a rod slidably carried by said support, means for holding one end of said rod in following contact with said plate means whereby said rod reciprocates in timed relation with the movement of said plate means, a flexible rotatable cable, rack and pinion means connecting said rod to said cable to rotate said pinion in response to reciprocating movement of said rod, and an indicator connected to the end of said cable for measuring the rotation of said cable in response to the reciprocation of said rod.

3. A shock absorber tester for testing the effectiveness of an automobile shock absorber interposed between the frame of the automobile and the unsprung portion thereof including a wheel in response to the oscillating impulse imparted to the unsprung portion of the automobile by the rotation of an unbalanced wheel comprising a portion of said unsprung portion, said shock absorber tester comprising a support, a coil spring carried by said support, a plate carried by said coil spring upon which the unsprung wheel assembly of the automobile is adapted to rest, a rod slidably carried by said support, resilient means for holding an end of said rod in resilient following contact with said plate whereby said rod reciprocates in timed relationship with the movement of said plate, a flexible rotatable cable, a rack carried by said rod, a pinion journaled in said frame and in intermeshing engagement with said rack, said pinion being connected to said cable to rotate said cable in response to reciprocating movement of said rod, and an indicator connected to the end of said cable for measuring the rotation of said cable in response to the reciprocation of said rod.

4. A shock absorber tester for testing the effectiveness of an automobile shock absorber interposed between the frame of the automobile and the unsprung portion thereof including a wheel in response to the oscillating impulse imparted to the unsprung portion of the automobile by the rotation of an unbalanced wheel comprising a portion of said unsprung portion, said shock absorber tester comprising a support, said support comprising telescopic members adjustably extensible with respect to each other, a coil spring carried by one of said members, a plate carried by said coil spring upon which the unsprung wheel assembly of the automobile is adapted to rest, a rod slidably carried by said support, resilient means carried by said support for holding an end of said rod in resilient following contact with said plate whereby said rod reciprocates in timed relationship with the movement of said plate, a flexible rotatable cable, rack and pinion means connecting said rod to said cable to rotate said pinion in response to reciprocating movement of said rod, and an indicator connected to the end of said cable for measuring the rotation of said cable in response to the reciprocation of said rod.

5. A shock absorber tester for testing the effectiveness of an automobile shock absorber interposed between the frame of the automobile and the unsprung portion thereof including a wheel in response to the oscillating impulse imparted to the unsprung portion of the automobile by the rotation of an unbalanced wheel comprising a portion of said unsprung portion, said shock absorber tester comprising a support, a coil spring carried by said support, a plate carried by said coil spring upon which the unsprung wheel assembly of the automobile is adapted to rest, a rod slidably carried by said support, resilient means carried by said plate for urging an end of said rod in resilient following contact with said plate whereby said rod reciprocates in timed relationship with the movement of said plate, a flexible rotatable cable, rack and pinion means connecting said rod to said cable to rotate said pinion in response to reciprocating movement of said rod, an indicator connected to the end of said cable for measuring the rotation of said cable in response to the reciprocation of said rod, and a balance testing device for positioning upon said wheel to unbalance said wheel a predetermined degree.

References Cited in the file of this patent

UNITED STATES PATENTS

| | | |
|---|---|---|
| 2,243,379 | Johnson | May 27, 1941 |
| 2,331,733 | Senger | Oct. 12, 1943 |
| 2,680,974 | Hunter | June 15, 1954 |
| 2,695,516 | Petroff | Nov. 30, 1954 |
| 2,777,327 | MacMillan | Jan. 15, 1957 |
| 2,799,158 | Federspiel | July 16, 1957 |